United States Patent
Weik

(10) Patent No.: US 7,024,480 B2
(45) Date of Patent: Apr. 4, 2006

(54) METHOD, DEVICES AND PROGRAM MODULES FOR DATA TRANSMISSION WITH ASSURED QUALITY OF SERVICE

(75) Inventor: Hartmut Weik, Stuttgart (DE)

(73) Assignee: Alcatel, Paris (FR)

( * ) Notice: Subject to any disclaimer, the term of this patent is extended or adjusted under 35 U.S.C. 154(b) by 703 days.

(21) Appl. No.: 09/985,243

(22) Filed: Nov. 2, 2001

(65) Prior Publication Data

US 2002/0056005 A1    May 9, 2002

(30) Foreign Application Priority Data

Nov. 9, 2000    (DE)    ............................. 100 55 422

(51) Int. Cl.
*G06F 15/16*    (2006.01)
*H04L 12/66*    (2006.01)
*H04L 12/56*    (2006.01)

(52) U.S. Cl. ..................... 709/227; 370/401; 370/352

(58) Field of Classification Search ................ 709/227; 370/352, 401

See application file for complete search history.

(56) References Cited

U.S. PATENT DOCUMENTS 6,363,065 B1 *    3/2002    Thornton et al. ........... 370/352

* cited by examiner

*Primary Examiner*—Larry D. Donaghue
(74) *Attorney, Agent, or Firm*—Sughrue Mion, PLLC

(57) ABSTRACT

The present invention concerns a method for data transmission with assured quality of service, as well as a gateway program module (GWM) for it, a front-end facility program module (VVM) for it, a terminal program module (EM) for it, a gateway (UAG) for it, a front-end facility (INA) for it and a terminal (TERA) for it.

According to the method, a terminal (TERA, TELA) requests from a gateway (UAG), connected to a data network (INT), a communication connection to a communication partner facility (TELB) with at least one predefined quality of service. The gateway (UAG) then requests from the data network (INT) the communication connection with the at least one predefined quality of service. The gateway (UAG) establishes the communication connection via the data network (INT) if the data network (INT) can provide at least the at least one predefined quality of service for the communication connection, or via a switched telecommunication network (PSTN), in particular, switching assured physical and/or logical communication connections, unless the data network (INT) can provide at least the at least one predefined quality of service for the communication connection.

21 Claims, 2 Drawing Sheets

METHOD, DEVICES AND PROGRAM MODULES FOR DATA TRANSMISSION WITH ASSURED QUALITY OF SERVICE

CROSS REFERENCE TO RELATED APPLICATIONS

The invention is based on a priority application DE 100 55 422.9 which is hereby incorporated by reference.

BACKGROUND OF THE INVENTION

The present invention concerns a method for data transmission with assured quality of service, as well as a gateway program module for it, a front-end facility program module for it, a terminal program module for it, a gateway for it, a front-end facility for it and a terminal for it.

Speech connections and other communication connections in which a transmission with a high quality of service is required, e.g. in real time, are increasingly established via data networks, particularly via the Internet. On the Internet, a speech transmission is rendered possible by means of the so-called VoIP (voice over Internet protocol). Communication connections via data networks, particularly via the Internet, are cost-effective for the subscribers using the communication connections. Data networks, however, are typically packet-switched and, in the event of high network occupancy, have a tendency to relay data packets with a delay, or even to erase them, so that an assured, real-time transmission of real-time data can be ensured only to a limited extent. There are under discussion procedures by which a predefined quality of service (QoS) or type of service (ToS) is intended to be assured in data transmission via the Internet. However, if transmission problems occur on the Internet, the respective real-time data is delayed or is even no longer transmitted so that, for example, a satisfactory communication is no longer possible on a VoIP connection. At present, therefore, VoIP connections are used particularly when disturbances are acceptable in communication between subscribers, for example, for private telephone conversations. For communication connections in which a higher quality of service is required, for example, for business telephone conversations, VoIP connections are however rather uncommon due to their limited quality.

SUMMARY OF THE INVENTION

The object of the present invention is to provide for a data transmission with assured quality of service, in which a data network is to be used for the data transmission.

Additionally provided, for the purpose of achieving the object, are: a gateway program module, a front-end facility program module, a terminal program module, a gateway, a front-end facility and a terminal.

This invention is based on the concept that a data network is used, if possible, for a communication connection requested by a subscriber's terminal. If, however, the data network is unable to provide a predefined quality of service required for the communication connection, the communication connection is established via a switched telecommunication network, for example, a public or private telephone network, an ATM network (ATM=asynchronous transfer mode) or an MPLS (multiprotocol label switching) network. A communication connection switched through the switched telecommunication network can be a physically switched connection and/or a logically switched connection. Switched logical connections can be established on, for example, a TDM (time-division multiplex) network, an ATM network or an MPLS network. Connections established on a switched telecommunication network can also be termed "reliable" or "assured" connections, because on these connections a predefined quality of service is assured by the, as it were, "reliable" (switched) telecommunication network. This method is convenient for the subscriber, because a gateway connected between the subscriber's terminal and both the data network and the switched telecommunication network provides for the maintenance of the required quality of service. In this way, the subscriber can make optimum use of the cost-effective transmission via the data network, for example, the Internet, and still get the benefit of an assured quality of service.

Further advantageous developments of the invention are disclosed in the dependent claims and in the description.

Even before the establishment of the communication connection, the gateway advantageously checks whether the data network can provide the required quality of service and, if this is the case, establishes the communication connection on the data network. Otherwise, the gateway establishes the communication connection via the switched telecommunication network.

In the case of a communication connection already existing on the data network, the gateway expediently checks, for example, cyclically or on the basis of a received external request, whether the required quality of service is still afforded and, if necessary, switches over to the switched telecommunication network.

In the case of a communication connection already existing on the switched telecommunication network, the gateway also advantageously checks whether the conditions in respect of the quality of service on the data network have changed. If a data transmission is possible on the data network with an assured quality of service, the gateway switches the communication connection over to the data network.

It is understood that any combinations of the above variants of the check of the quality of service that can be provided by the data network before and/or during a communication connection already existing on the data network or the switched telecommunication network are possible for the gateway. In addition, such a check can also be requested by the terminal requesting the communication connection. Furthermore, in the event of a change in the quality of service that can be provided, the data network can send a message to the gateway.

The quality of service to be requested from the data network for a particular communication connection can be determined by the gateway in various ways:

In one variant, the gateway determines, on the basis of a destination address provided for the communication connection, e.g. on the basis of an assignment table, which quality of service is required for a communication connection to this destination address. If, for example, the subscriber requesting the communication connection dials on his terminal a call number of a business partner, the gateway preferably establishes the communication connection on the switched telecommunication network providing a high quality of service. If, on the other hand, the subscriber dials a call number for a private telephone conversation, the gateway determines a lower quality of service for this and consequently uses the data network in preference.

It is also possible for the subscriber to inform the gateway, in a request message, of the minimum quality of service which he requires. This can be, for example, the request message by which a communication connection is requested from the gateway. The requesting of the quality of service can apply either to the current establishment of a communication connection or to the subsequent establishment of communication connections. In order to request the quality of service, the subscriber dials, for example, a prefix to a call number or sets the corresponding quality of service value or values via a usable operator interface-provided by the gateway, for example, by means of an Internet browser.

The gateway is preferably integrated into an access network which enables the subscriber to access both the data network and the switched telecommunication network. In the case of the access network, a front-end facility, serving several subscribers, is then connected between the subscriber and the gateway.

In a particularly preferred variant, the subscriber terminal is coupled to the front-end facility via a so-called hybrid fiber coax (HFC) cable via which, for example, speech, data traffic and radio and television data can be transmitted on different channels.

In any case, the front-end facility determines, in a preferred variant, whether a communication connection is to be established, for example, for speech or data transmission. For this purpose, the front-end facility preferably evaluates destination addresses respectively specified for the communication address or another of the identifiers assigned to the speech transmission or the data transmission. Speech and data, however, are each expediently transmitted from the terminal to the front-end facility on separate transmission paths, in particular, on different channels of the HFC cable, so that the front-end facility can determine the respectively required quality of service on the basis of the selected transmission path and request that from the gateway.

The front-end facility preferably sends to the gateway a request message in which is specified a minimum quality of service to be maintained for a communication connection to be established. It is also possible for the front-end facility to use separate transmission paths assigned to a respective minimum quality of service to be maintained, for example, separate channels of a transmission line for the transmission of speech and other data, and for the gateway to determine, on the basis of the respectively used transmission path, the minimum quality of service to be maintained for the respective communication connections necessary for the further transmission of the speech and other data.

It is possible for the gateway and the front-end facility to be combined as a common device.

BRIEF DESCRIPTION OF THE DRAWINGS

The invention and its advantages are described below with the aid of the drawing, with reference to an embodiment example.

DETAILED DESCRIPTION OF THE INVENTION

Figure 1:
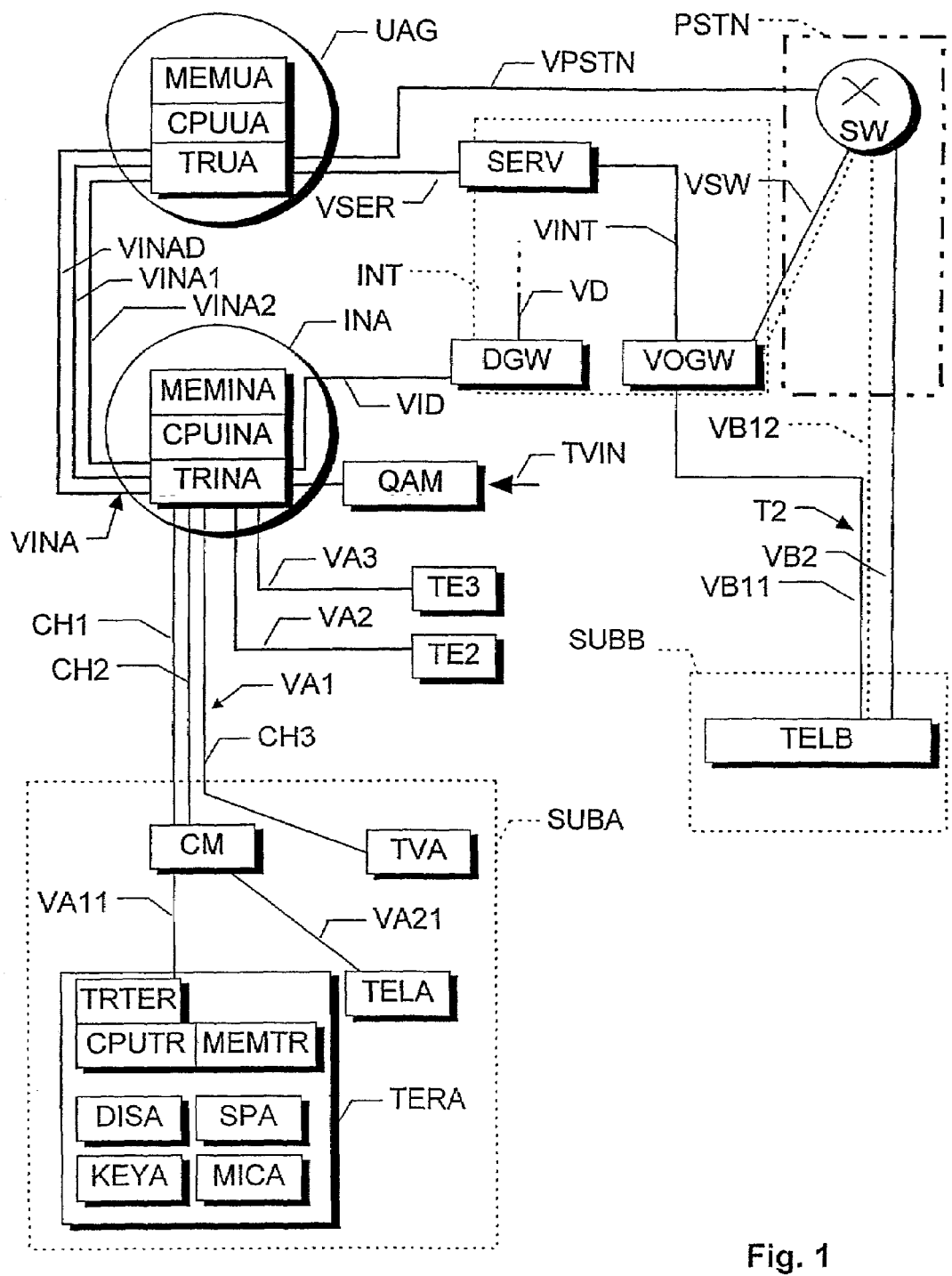
FIG. 1 shows an arrangement for the execution of the method according to the invention, with a terminal TERA according to the invention, a front-end facility INA according to the invention and a gateway UAG according to the invention.

FIG. 1 depicts an illustrative arrangement with which the invention can be realized. FIG. 1 shows a switched telecommunication network PSTN, a data network INT and terminals TERA, TELA and TVA of a subscriber SUBA who is indicated by a broken-line box. The terminal TVA is, for example, a television or radio receiver and the terminal TELA a fixed-network telephone. The terminal TERA is explained at a later point.

The terminals TERA, TELA and TVA of the subscriber SUBA are connected to a front-end facility INA via a subscriber connection line VA1. The front-end facility INA additionally serves, via subscriber connection lines VA2, VA3, terminals or terminal groups TE2 and TE3 respectively of two further subscribers, not represented. Further subscriber connection lines can also be connected to the front-end facility INA.

In this case, the subscriber connection lines VA1, VA2, VA3 are HFC cables (HFC=hybrid fiber coax), on which various transmission channels are respectively provided as separate transmission paths. The front-end facility INA terminates the subscriber connection lines VA1, VA2, VA3, sending and receiving data on the respective transmission channels. Additionally connected to the front-end facility INA, or integrated into it, is a multiplexer QAM which feeds multimedia data TVIN, for example, radio and/or television signals or other multimedia data, on to the subscriber connection lines VA1, VA2, VA3. In the embodiment example, the multiplexer QAM operates according to the so-called quadrature amplitude multiplex method. The multimedia data is fed in on a channel CH3 of the subscriber connection line VA1 which represents, for example, further channels of the subscriber connection line VA1 which are not depicted and are provided for multimedia data. On the subscriber side, the terminal TVA of the subscriber SUBA receives the multimedia data on the channel CH3.

Provided for the purpose of connecting the terminals TERA and TELA to the subscriber connection line VA1 is a subscriber-side network termination CM which, in this case, is a so-called cable modem to which the terminals TERA and TELA are connected via lines VA11 and VA21 respectively. The network termination CM terminates channels CH1, CH2 of the subscriber connection line VA1 and establishes a connection between the channels CH1, CH2 and the lines VA11 and VA21 respectively.

If the subscriber connection line is an ISDN subscriber connection line (ISDN=integrated services digital network), the network termination CM could also be, for example, a so-called NT adapter (NT=network terminator), to which the terminals TERA and TELA are connected via a so-called So bus. Furthermore, the network termination CM could also have a connection for a so-called VoIP bus (VoIP=voice over Internet protocol), to which the terminals TERA and TELA can be connected.

The front-end facility INA is connected, via lines or transmission paths VINAD, VINA1, VINA2 of a line or a line bundle VINA, to a gateway UAG which establishes communication connections both to the switched telecommunication network PSTN and to the data network INT.

The data network INT can be, for example, the Internet or another packet-switched data network. Of the data network INT, only a server SERV, gateways DGW and VOGW, and connections VD, VINT are shown, these representing, by way of example, other servers, routers, switches, transmission paths, etc. of the data network INT which are not depicted. Via the gateway DGW, the front-end facility INA can send data directly to the data network INT or receive data directly from it, without involvement of the gateway UAG. The server SERV represents, by way of example, network facilities through which the gateway UAG can establish communication connections within the data network INT. The gateway UAG can be assigned to the data network INT.

The telecommunication network PSTN can be, for example, an analog or an ISDN telecommunication network. Of the telecommunication network PSTN, only a switching centre SW is shown, representing, by way of example, switching centres, network management systems, connection lines, etc. which are not depicted.

In principle, the telecommunication network PSTN can also be based on a data network, which is itself packet-switched but on which logical channels can be established, i.e., as it were "switched", at a predefined data rate guaranteed by the respective data network, as is possible, for example, in the case of an ATM network (ATM=asynchronous transfer mode). In any case, the telecommunication network PSTN is preferably a network which makes available defined qualities of service (QoS) during transmission and guarantees security against unauthorized access to the data transmitted on the network. For security reasons, therefore, there are established in such a case so-called tunnel connections on which communication is effected via tunnel protocols, for example, via the so-called IPSecure protocol (IPSec). In a further advantageous solution, the telecommunication network PSTN is a so-called label switching network, for example, a multiprotocol label switching network (MPLS), the connections in that case being routed, with assured quality of service, via so-called label switching tunnels or MPLS tunnels.

A terminal TELB of a subscriber SUBB is connected, via a connection VB2 established on, for example, a subscriber connection line T2, to the switching centre SW. The latter in this case performs the functions of, for example, a local switching centre. The terminal TELB is connected to the gateway VOGW via a further connection VB11. In this case, the gateway VOGW is a VoIP gateway and enables the terminal TELB to make so-called VoIP connections via the data network INT. The connection VB11 can be, for example, a direct connection between the gateway VOGW and the terminal TELB, which is shown in FIG. 1 by a continuous line, or, alternatively, a logical connection which, in a variant VB12 indicated in the drawing as a broken line, leads via the subscriber connection line T2 and the connection VSW to the switching centre SW or to another switching centre of the telecommunication network PSTN which affords access to the data network INT.

A communication connection from one of the terminals TERA or TELA of the subscriber SUBA to the terminal TELB of the subscriber SUBB is effected via the front-end facility INA and the gateway UAG. In this case, the gateway UAG determines whether the data network INT can provide at least a predefined quality of service for the communication connection. If this is the case, the gateway UAG establishes the communication connection via the data network INT, otherwise via the telecommunication network PSTN. Various variants of this are to be explained at a later point. Firstly, however, consideration is to be given to the structure of the components, according to the invention, gateway UAG, front-end facility INA, terminal TERA, gateway program module GWM, front-end facility program module VVM and terminal program module EM.

Figure 4:
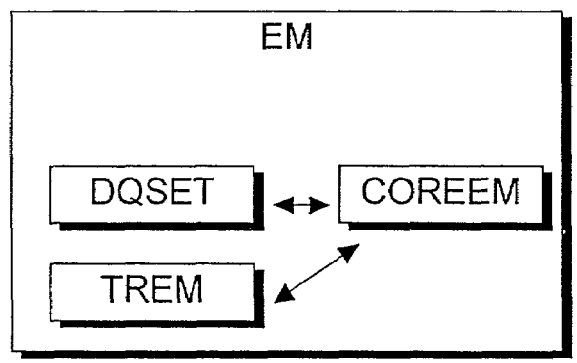
FIG. 4 shows a terminal program module EM in schematic form.

The terminal TERA is, for example, a personal computer or a telephone terminal. The terminal TERA comprises a connection means TRTER, serving as a transmitting and receiving means, which is, for example, a modem, an ISDN adapter or a network card. By means of the connection means TRTER, the terminal TERA can establish a connection to the network termination CM. The terminal TERA additionally comprises a control means CPUTR and a storage means MEMTR. The control means CPUTR is, for example, a processor by means of which it is possible to execute program code of program modules, for example, of the terminal program module EM represented schematically in FIG. 4, which are stored in the storage means MEMTR. The storage means consists of, for example, a hard disk or RAM modules. The terminal TERA additionally comprises a display means DISA and an input means KEYA. The display means is, for example, a computer monitor or an LCD display (liquid crystal display). The input means KEYA can be a keyboard or a mouse. The terminal TERA additionally comprises a loudspeaker SPA and a microphone MICA which permit speech output and speech input.

Figure 3:
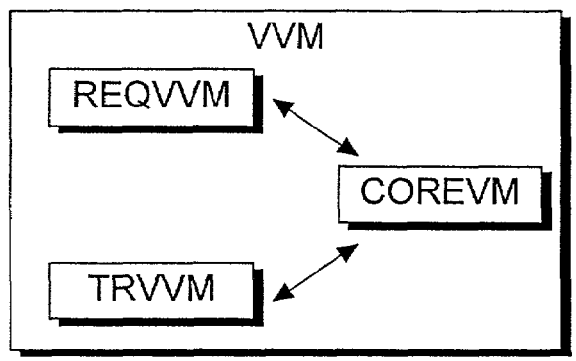
FIG. 3 shows a front-end facility program module VVM in schematic form.

Of the front-end facility INA, some essential components are shown by way of example, namely, a transmitting and receiving means TRINA, as well as a control means CPUINA and a storage means MEMINA. By means of the transmitting and receiving means TRINA which comprises, for example, plug-in transmitting and receiving cards, a coupling network or suchlike, the front-end facility INA can establish data and speech connections via the subscriber connection lines VA1, VA2, VA3. Moreover, the transmitting and receiving means TRINA can establish the connections VINAD, FINA1, VINA2 to the gateway UAG and the connection VID to the data gateway DGW. The control means CPUINA is a processor or a group of processors which can execute program code of program modules, for example, of the front-end facility program module VVM represented schematically in FIG. 3, which are stored in the storage means MEMINA. Under control of the operating system, the control means CPUINA controls the functions of the front-end facility INA by means of the program modules and thereby influences the functions of the transmitting and receiving means TRINA serving as a connection means. The transmitting and receiving means TRINA, the control means CPUINA and the storage means MEMINA are connected to one another by connections which are not represented. In addition, the front-end facility INA can comprise further modules, for example, a coupling network or an interface to a network management system, not depicted, for example, for operation of the telecommunication network PSTN.

Figure 2:
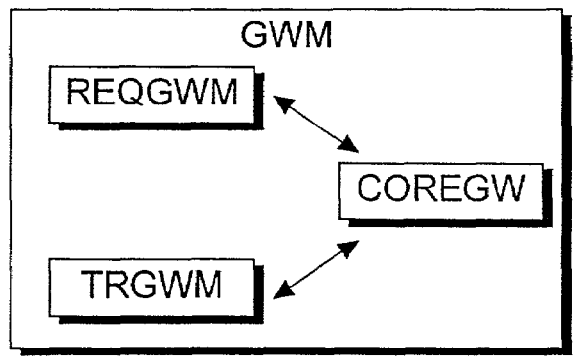
FIG. 2 shows a gateway program module GWM in schematic form.

Like the front-end facility INA, the gateway UAG is also represented in schematic form only. In this case, a control means CPUUA corresponds to the control means CPUINA, storage means MEMUA correspond to the storage means MEMINA and transmitting and receiving means TRUA correspond to the transmitting and receiving means TRINA. Under control of an operating system, the control means CPUUA controls the functions of the gateway UAG by means of program modules, for example, the gateway program module GWM represented schematically in FIG. 2, and thereby influences the functions of the transmitting and receiving means TRUA serving as a connection means. The transmitting and receiving means TRUA, the control means CPUUA and the storage means MEMUA are connected to one another by connections which are not represented. The transmitting and receiving means TRUA are designed for switching a communication connection and for transmitting and receiving data on the connections VINAD, FINA1, VINA2 to the front-end facility INA and on a connection VPSTN to the switching centre and on a connection VSER to the server SERV.

In this case, the gateway program module GWM, the front-end facility program module VVM and the terminal program module EM each comprise program code which is executed by the control means CPUUA, CPUINA and CPUTR respectively. The modules GWM, VVM and EM are generated in, for example, a programming language, for example, "C", "C++", Java or suchlike, and are then translated by a compiler or an interpreter into program code which can be executed by the control means CPUUA, CPUINA and CPUTR respectively. In respect of function, the modules GWM, VVM and EM are represented in schematic form only and can also be configured differently in each individual case. The modules GWM, VVM and EM each comprise a central control unit, denoted by COREGW, COREVM and COREEM respectively. The central control units COREGW, COREVM of the modules GWM, VVM each control request functions REQGWM and REQVVM respectively, serving as request functions, as well as transmitting and receiving functions TRGWM and TRVVM respectively, serving as transmitting and receiving means. The central control unit COREEM of the terminal program module EM controls a transmitting and receiving function TREM, serving as a transmitting and receiving means, as well as a function DQSET provided for the determination of a respective quality of service required for a communication connection. The respective functions REQGWM, TRGWM; TRVVM, REQVVM, TREM, DQSET of the modules GWM, VVM and EM can be designed solely for communication with the central control units COREGW, COREVM and COREEM respectively assigned to them, as well as for a direct communication and/or for a direct mutual function request in each case.

Explained below are some variants on the establishment of communication connections originating from one of the terminals TERA or TELA of the subscriber SUBA.

The terminal TELA provided for speech communication or video telephony sends a request message, in which a call number assigned to the terminal TELB of the communication partner SUBB is specified, to the network termination CM.

This message is, for example, a so-called call-setup message. The network termination CM forwards the request message to the front-end facility INA via the channel CH1, the channel CH1 being reserved for communication connections with a high quality of service, i.e., particularly speech communication or video telephony.

It is also possible for the request message to be transmitted between the network termination CM and the front-end facility INA on a signalling channel, not represented, provided for signalling purposes. Like the channel CH1, this, as an "assured channel", as it were, can be assigned to a predefined quality of service. However, the signalling channel can also be a "non-assured channel", for example, a signal channel on an ISDN subscriber connection line, since, in the event of any loss occurring, a request message can also be repeatedly sent to the front-end facility INA without impairment of the quality of service of the subsequently established communication connection requested by the request message.

The request message received in this case on the channel CH1 is forwarded by the front-end facility INA, by means of the transmitting and receiving means TRINA and employing the transmitting and receiving function TRVVM, on the transmission path VINA1, which is likewise provided for communication connections with a high quality of service. There can be established in the front-end facility INA, for this purpose, a fixed assignment of the transmission path VINA1 to the channel CH1, as well as to further channels for communication connections with a high service quality, leading, if applicable, to further terminals TE2, TE3.

It is possible that, from the request message received from the terminal TELA, the request function REQVVM generates a new request message in which there is specified, for example, a quality of service to be requested for the communication connection to be established by the terminal TELA.

The gateway UAG identifies, on the basis of the transmission path VINA1 selected by the front-end facility INA or from an identifier specified in the request message, that a high quality of service is required for the communication connection desired in the request message. The gateway UAG therefore inquires from the server SERV, by means of its request function REQGWM, whether the required minimum quality of service can be provided by the data network INT. If this is the case, the gateway UAG, the server SERV and the gateway VOGW complete the desired communication connection so that, as a whole, a communication connection VA11, CH1, VINA1, VSER, VINT, VB11 or VB12 is established to the terminal TELB.

The gateway UAG preferably communicates to the data network INT, in this case, the server SERV, which quality of service is to be maintained for the communication connection. For this purpose, for example, a so-called QoS (quality of service) or ToS (type of service) value is sent to the data network INT.

If the required minimum quality of service cannot be provided by the data network INT, instead of establishing the communication connection via the data network INT, the gateway UAG establishes the communication connection via the switched telecommunication network PSTN so that, as a whole, a communication connection VA11, CH1, VINA1, VPSTN, VB2 is established to the terminal TELB.

In the case of the variant explained above, the gateway UAG checks, in connection with a communication connection to be established, through case-by-case interaction with the server SERV, whether a connection with a minimum quality of service is possible via the data network INT. It is also possible for the gateway UAG to cyclically inquire of the server SERV which quality of service or which qualities of service can currently be provided by the data network INT, and to store these respectively ascertained values in the storage means MEMUA. When the gateway UAG then receives a request message from the front-end facility INA for a communication connection with a minimum quality of service to be maintained, the gateway UAG checks, on the basis of the stored values, whether the required quality of service can currently be provided by the data network INT.

The gateway UAG preferably checks, for example, cyclically, whether the respectively new conditions alter in respect of the quality of service that can be provided by the data network INT. It is also possible for a change in respect of the quality of service that can be provided by the data network INT to be communicated to the gateway UAG by the data network INT, in this case, by way of example, by the server SERV or also, for example, by a network management system, not represented.

In any case, it is also possible for the gateway UAG to switch an existing communication connection over from the data network INT to the switched telecommunication network PSTN, and vice versa. For example, the following switchovers are possible:

The gateway UAG determines that the required quality of service is no longer maintained for the communication connection VA11, CH1, VINA1, VSER, VINT, VB12 to the terminal TELB routed via the data network INT. Consequently, the gateway UAG and the switched telecommunication network PSTN, i.e., the switching centre SW, establish the communication path VPSTN, VB12. The switching centre SW then switches the connection V12 over from the connection VSW to the connection VPSTN and the gateway UAG switches the connection VSER over to the connection VPSTN. The two switchover operations can be synchronized to one another through, for example, a synchronization procedure. It is simpler, however, if the gateway UAG and the switching centre SW switch the two connections VPSTN; VSER, VINT, VSW in parallel to one another for a predefined switchover period. This is because, in principle, it is sufficient for receiving in parallel to be effected on both connections VPSTN; VSER, VINT, VSW and for switchover between the respective communication paths to be effected first on the transmitting side and then on the receiving side.

In the case of a further situation, the terminal TERA establishes a communication connection to the terminal TELB. If this is a communication connection with a high quality of service, for example, a speech connection or video telephony connection, the above procedure can also be executed by the terminal TERA, where the channel CH1 is selected for establishing a communication connection with a high quality of service. If, on the other hand, a communication connection with a lower quality of service is required, for example, for the exchange of data with the terminal TELB or for loading data from the data network INT, the terminal TERA sends the respective request message via the channel CH2 to the front-end facility INA. The latter then routes the request message to the gateway UAG via the transmission path VINA2. In this case, the channel CH2 and the transmission path VINA2 are each provided for communication connections with a lower quality of service. The transmitting and receiving means TRUA of the gateway UAG determine, on the basis of the selected transmission path VINA2, that communication connection with a low quality of service is required. Accordingly, the gateway UAG establishes the respective communication connection, if possible, via the data network INT, unless the latter cannot assure the required quality of service, so that the respective communication connection has to be established via the switched telecommunication network PSTN.

Any execution time differences occurring in the switchover of the communication connections from the switched telecommunication network PSTN to the data network INT and vice versa which are caused by differing data transfer rates of the two networks are equalized by the respective network facilities involved in the switchover, in this case, the switching centre SW and/or the gateway UAG, for example, through data buffering.

Instead of being assigned to a single, predefined quality of service, the channels CH1 and CH2 can also be assigned to a group of qualities of service. The terminal TERA sends data packets, containing data of differing quality of service, on a common channel. For example, the terminal TERA can send and receive both data packets with data of a speech communication connection and data packets with data of a streaming communication connection on the channel CH1. In this case, streaming data refers, for example, to interactively controlled video-on-demand (VoD) data, which is loaded and played by the terminal TERA from, for example, a VoD server, which is not represented. The terminal TERA controls the VoD server interactively. In order that an image sequence can be played back without interruption, a relatively high quality of service is required for streaming data. In this case, however, due to a data buffer provided in the terminal TERA, this can be less than the quality of service of the said speech communication connection. In any case, the terminal TERA, or the terminal program module EM with its function DQSET, enters in the respective data packets an identifier from which the front-end facility INA and/or the gateway UAG can determine the quality of service to which the respective data packet is assigned, so that the gateway UAG can determine the quality of service respectively required for the transmission of the data packet and can accordingly establish communication connections with predefined qualities of service via the data network INT or the switched telecommunication network PSTN.

It is also possible for the front-end facility INA and/or the gateway UAG to determine, on the basis of a call number, e.g., of the terminal TELB, specified by the terminal TERA or the terminal TELA in a request message for the establishment of a communication connection, that a predefined quality of service is required for the communication connection. For this purpose, tables containing an assignment of destination call number to quality of service are provided in, for example, the front-end facility INA and/or in the gateway UAG, in their-storage means MEMINA and MEMUA respectively. Moreover, in a simple variant, there could be provided in the front-end facility INA and/or in the gateway UAG a "caller to quality of service" table in which a predefined quality of service is generally assigned to all communication connections requested by a subscriber. The respective quality of service is then assigned, for example, to the source address of the respective communication connection, for example, a first quality of service is assigned to the call number of the subscriber SUBA and a second quality of service is assigned to the call number of the terminal TE2. Further refinements are easily feasible, for example, a high quality of service could be configured for all speech communication connections requested by the subscriber SUBA, but with a lower quality of service configured for data communication connections. The gateway UAG and/or the front-end facility INA could then identify, for example, on the basis of the call number of the subscriber SUBA and a speech or data type identifier contained in a request message, which quality of service is required for the respective communication connection.

The above-mentioned configuration data, e.g., the destination call number to quality of service and/or the "caller to quality of service" table, could be set by the respective subscribers, e.g., the subscriber SUBA and/or by a network management system, not represented.

For the purpose of establishing a communication connection, however, it is not absolutely essential for the terminals TERA, TELA of the subscriber SUBA to use a communication path or channel CH1, CH2 assigned in each case to the quality of service of the respective communication connection, or to send a separate identifier to the front-end facility INA in respect of the quality of service to be maintained.

A communication connection routed from the terminal TERA to a facility of the data network INT, particularly a data connection, can be established by the front-end facility INA, for example, either via the transmission path VINAD and the gateway UAG or directly, via the connection VID, to the gateway DGW. The latter then establishes the further connection VD to the facility, not represented, in the data network INT, from which, for example, the terminal TERA can receive data, e.g., program data, image data or suchlike. Via the connection VID to the gateway DGW, the front-end facility INA can also provide corresponding online sessions with the data network INT requested by the terminals TE2, TE3.

It is possible to predefine that the gateway UAG does not itself route predefined communication connections via the switched telecommunication network PSTN if the data network INT is unable to provide a predefined minimum quality of service. For this purpose, for example, a table can be stored in the gateway UAG and/or the front-end facility INA specifying for which, preferably lower, qualities of service the switched telecommunication network PSTN is not to be used. It is also possible for a terminal, e.g. the terminal TERA, to send an identifier to the front-end facility INA and/or the gateway UAG on the basis of which the latter determine that the respectively requested communication connection is not to be routed via the switched telecommunication network PSTN.

The quality of service required for a communication connection in a particular case can be requested from the front-end facility INA and/or the gateway UAG by the terminals TERA, TELA in connection with the establishment of a communication connection in each case. For example, a call number prefix which is assigned to a predefined quality of service can be entered on the terminal TELA.

However, the gateway UAG and/or the front-end facility INA can also be individually configured in respect of qualities of service to be maintained. For example, control codes or control messages, for example, DTMF codes (dual tone multi-frequency) or ISDN UUS messages (UUS=user-to-user signalling) can be transmitted for this purpose from the terminal TELA to the front-end facility INA, which sends the codes or control messages, or messages derived from them, to the gateway UAG.

In a convenient variant, the gateway UAG and/or the front-end facility INA provide the subscriber SUBA with an operator interface for setting his individual configuration. For example, a connection is established for this purpose between the terminal TERA and the gateway UAG or the front-end facility INA, with the data network INT included if applicable. The gateway UAG and/or the front-end facility INA then send data which can be displayed by the terminal TERA by means of, for example, a so-called browser, e.g. a Netscape Navigator or a Microsoft Explorer. In this case, for example, a mask is displayed into which the subscriber SUBA can in each case enter a call number or another destination address of a communication partner, as well as a minimum quality of service to be maintained for a communication connection to this call number. The data entered in the mask is then sent by the terminal TERA to the gateway UAG and/or the front-end facility INA and stored by the latter.

It is also possible that, in the case of request messages sent by the terminal TERA, the gateway UAG and/or the front-end facility INA determine the respective quality of service of the requested communication connection from configuration data which is loaded, as a subscriber profile or service profile of the subscriber SUBA, into the gateway UAG and/or into the front-end facility INA by a network management system, which is not represented.

Further variants of the invention are easily feasible:

In principle, the subscriber connection lines VA1, VA2, VA3 could also be copper or glass fibre ISDN subscriber connection lines or DSL (digital subscriber line) connection lines, and the front-end facility INA could be a respectively adapted front-end facility.

Furthermore, it is possible for radio connections to be provided instead of the subscriber connection lines VA1, VA2, VA3. The terminal TERA is then, for example, a mobile radio telephony terminal and the front-end facility INA is a so-called base station. It is also possible for the subscriber connection lines VA1, VA2, VA3 to be WLL radio connections (WLL=wireless local loop) and for the front-end facility INA and the network termination CM to be designed for the establishment of WLL radio connections.

The front-end facility INA and the gateway UAG can also be combined as a common facility. In this case, for example, the front-end facility INA could be designed for executing the gateway program module GWM. Furthermore, the transmitting and receiving means TRINA would then have to be designed for establishing the connections VSER and VPSTN routed to the data network INT and to the switched telecommunication network PSTN.

It is also possible for the front-end facility INA to provide functions of a switching centre, particularly a local switching centre, the front-end facility INA being able to establish connections, for example, between the subscriber terminals TERA, TELA, TE2 and TE3 connected to it.

The front-end facility INA and the gateway UAG can each be assigned to the switched telecommunication network PSTN and be controlled and monitored by, for example, a network management system which operates and manages it.

A server can also be provided as a terminal, e.g., as a terminal TERA, which provides, for example, VoD data or other multimedia data for the transmission of which a minimum quality of service is required.

The channel CH3 can also be terminated by the network termination CM. The latter then preferably comprises connection means for connecting, for example, the terminal TVA, representing a radio or television receiver.

It is understood that any combinations of the measures and arrangements stated in the claims and in the description are possible.

The invention claimed is:

1. Method for data transmission with assured quality of service, in which
   a terminal requests from a gateway, connected to a data network, a communication connection to a communication partner facility with at least one predefined quality of service,
   the gateway requests from the data network the communication connection with the at least one predefined quality of service,
   the gateway establishes the communication connection via the data network if the data network can provide at least the at least one predefined quality of service for the communication connection,
   the gateway establishes the communication connection via a switched telecommunication network, in particular, switching assured physical or logical communication connections, unless the data network can provide at least the at least one predefined quality of service for the communication connection,
   wherein the request from the terminal determines the at least one predefined quality of service.

2. Method according to claim 1, wherein the gateway checks, in the case of a communication connection already established on the data network, whether the data network can provide at least the required predefined quality of service for the communication connection and, if the predefined quality of service is not attained, the gateway switches the communication connection over to the switched telecommunication network or the gateway checks, in the case of a communication connection already established on the switched telecommunication network, whether the data network can provide at least the required predefined quality of service for the communication connection and the gateway switches the communication connection over to the data network if the data network can provide the at least one predefined quality of service for the communication connection.

3. Method according to claim 1, wherein the gateway determines the minimum quality of service to be requested for the communication connection on the basis of a destination address of the communication partner provided for the communication connection, in particular, on the basis of a call number.

4. Method according to claim 1, wherein the terminal sends to the gateway a request message in which is specified quality of service to be set by the gateway for the current establishment of a communication connection or for the subsequent establishment of communication connections.

5. Method according to claim 1, wherein the gateway receives the request for the communication connection with the predefined quality of service from a front-end facility, in particular, a hybrid fiber coax front-end facility, connected between the terminal and the gateway.

6. Method according to claim 5, wherein the front-end facility determines, particularly on the basis of a destination address of the communication partner provided for the communication connection or on the basis of a transmission path selected by the terminal for the purpose of establishing the communication connection and set up between the terminal and the front-end facility, which minimum quality of service is required for the communication connection requested by the terminal, and the front-end facility communicates to the gateway information concerning the minimum quality of service to be requested for the communication connection.

7. Method according to claim 5, wherein the front-end facility communicates to the gateway a first request for a first communication connection with a first predefined quality of service to be established for the terminal on a first transmission path, the front-end facility communicates to the gateway a second request for a second communication connection with a second predefined quality of service to be established for the terminal on a second transmission path and the gateway determines, on the basis of the first or second transmission path selected for the first and second request respectively, that a first quality of service is required for the first communication connection and a second quality of service is required for the second communication connection.

8. Gateway program module for data transmission with assured quality of service, which contains program code, tangibly embodied on a computer readable media, which can be executed by a control means of a gateway which can be connected to a data network and a switched telecommunication network, which comprises transmitting and receiving means for receiving a request in which a communication connection between a terminal and a communication partner facility is requested with a predefined quality of service, which comprises request means which are designed so that the gateway can request from the data network the communication connection with the predefined quality of service, and in which the transmitting and receiving means are designed so that the gateway can establish the communication connection via the data network if the data network can provide at least the required predefined quality of service for the communication connection and the gateway can establish the communication connection via the switched telecommunication network, in particular, switching assured physical or logical communication connections, unless the data network can provide at least the required predefined quality of service for the communication connection, wherein the request from the terminal determines the at least one predefined quality of service.

9. Storage means for storing a gateway program module according to claim 8, wherein said storage means comprises one of a diskette, CD-ROM, digital versatile disk, and hard-disk drive.

10. A computer, serving as a terminal, gateway or front-end facility, wherein said computer includes storage means according to claim 9, and control means for executing the program code of the respective gateway program module or front-end facility program module or terminal program module stored on the storage means.

11. A switching centre, wherein said switching center includes a stored gateway program according to claim 8.

12. Front-end facility program module for data transmission with assured quality of service, which contains program code, tangibly embodied on a computer readable media, which can be executed by a control means of a front-end facility which can be connected to a gateway, which comprises transmitting and receiving means for receiving a request in which a communication connection between a terminal and a communication partner facility is requested with a predefined quality of service, which comprises request means which are designed so that the front-end facility can request from the gateway, connected to a data network, the communication connection with the predefined quality of service, the gateway establishing the communication connection via the data network if the data network can provide at least the required predefined quality of service for the communication connection, and establishing it via a switched telecommunication network, in particular, switching assured physical or logical communication connections, unless the data network can provide at least the required predefined quality of service for the communication connection, wherein the request from the terminal determines the at least one predefined quality of service.

13. Storage means for storing a front-end program module according to claim 12, wherein said storage means comprises one of a diskette, CD-ROM, digital versatile disk, and hard-disk drive.

14. A switching centre, wherein said switching center includes a front-end facility program module according to claim 12.

15. Terminal program module for data transmission with assured quality of service, which contains program code, tangibly embodied on a computer readable media, which can be executed by a control means of a terminal, which comprises transmitting means which are designed so that the terminal can request from a gateway, or from a front-end facility preceding that latter, a communication connection to a communication partner facility with at least one predefined quality of service, in particular, the transmitting means are designed for transmitting a request message in which is specified quality of service for the current establishment of a communication connection or the subsequent establishment of communication connections or the transmitting means are designed for selecting a transmission path, set up between the terminal and the front-end facility and assigned to the at least one quality of service, for the purpose of establishing the communication connection or the transmitting means are designed for sending at least one data packet, assigned to the communication connection, in which is contained an identifier assigned to the quality of service, wherein the request from the terminal determines the at least one predefined quality of service.

16. Storage means for storing a terminal program module according to claim 15, wherein said storage means comprises one of a diskette or CD-ROM, digital versatile disk, and hard-disk drive.

17. Gateway for data transmission with assured quality of service, which can be connected to a data network and to a switched telecommunication network, which comprises transmitting and receiving means for receiving a request in which a communication connection between a terminal and a communication partner facility is requested with a predefined quality of service, which comprises request means which are designed so that the gateway can request from the data network the communication connection with the predefined quality of service, and in which the transmitting and receiving means are designed so that the gateway can establish the communication connection via the data network if the data network can provide at least the required predefined quality of service for the communication connection and the gateway can establish the communication connection via the switched telecommunication network, in particular, switching assured physical or logical communication connections, unless the data network can provide at least the required predefined quality of service for the communication connection, wherein the request from the terminal determines the at least one predefined quality of service.

18. A switching center, wherein said switching center is integrated with a gateway according to claim 17.

19. Front-end facility for data transmission with assured quality of service, which can be connected to a gateway, which comprises transmitting and receiving means for receiving a request in which a communication connection between a terminal and a communication partner facility is requested with a predefined quality of service, which comprises request means which are designed so that the front-end facility can request from the gateway, connected to a data network, the communication connection with the predefined quality of service, the gateway establishing the communication connection via the data network if the data network can provide at least the required predefined quality of service for the communication connection, and establishing it via a switched telecommunication network, in particular, switching assured physical or logical communication connections, unless the data network can provide at least the required predefined quality of service for the communication connection, wherein the request from the terminal determines the at least one predefined quality of service.

20. A switching center, wherein said switching center is integrated with a front-end facility according to claim 19.

21. Terminal for data transmission with assured quality of service, which comprises transmitting means which are designed so that the terminal can request from a gateway, or from a front-end facility preceding the latter, a communication connection to a communication partner facility with at least one predefined quality of service, in particular, the transmitting means are designed for transmitting a request message in which is specified quality of service for the current establishment of a communication connection or the subsequent establishment of communication connections or the transmitting means are designed for selecting a transmission path, set up between the terminal and the front-end facility and assigned to the at least one quality of service, for the purpose of establishing the communication connection or the transmitting means are designed for sending at least one data packet, assigned to the communication connection, in which is contained an identifier assigned to the quality of service, wherein the request from the terminal determines the at least one predefined quality of service.

* * * * *